(12) United States Patent
Ebner et al.

(10) Patent No.: US 7,744,360 B2
(45) Date of Patent: Jun. 29, 2010

(54) PROCESS FOR MAKING TOOTHBRUSHES

(75) Inventors: Winfried Ebner, Freiberg (DE); Hans Kraemer, Buehl (DE); Berthold Meyer, Neustadt (DE); Andreas Walgenbach, Neustadt (DE)

(73) Assignee: GlaxoSmithKline Consumer Healthcare GmbH & Co., KG, Buehl (Baden) (DE)

( * ) Notice: Subject to any disclaimer, the term of this patent is extended or adjusted under 35 U.S.C. 154(b) by 337 days.

(21) Appl. No.: 10/576,734

(22) PCT Filed: Oct. 22, 2004

(86) PCT No.: PCT/EP2004/012062

§ 371 (c)(1),
(2), (4) Date: Oct. 1, 2007

(87) PCT Pub. No.: WO2005/039858

PCT Pub. Date: May 6, 2005

(65) Prior Publication Data

US 2008/0105999 A1    May 8, 2008

(30) Foreign Application Priority Data

Oct. 22, 2003    (GB) .................... 0324658.4

(51) Int. Cl.
*B29C 45/14*  (2006.01)
*B29C 45/16*  (2006.01)
(52) U.S. Cl. .............. 425/111; 425/112; 425/805; 264/243
(58) Field of Classification Search ........ 264/243, 264/229, 266; 425/111, 112, 805
See application file for complete search history.

(56) References Cited

U.S. PATENT DOCUMENTS

| 1,323,042 | A |   | 11/1919 | Gardner |
| 2,266,195 | A |   | 12/1941 | Hallock |
| 2,789,313 | A | * | 4/1957 | Knowles ............... 425/181 |
| 4,472,853 | A |   | 9/1984 | Rauch |
| 4,691,405 | A |   | 9/1987 | Reed et al. |
| 4,864,676 | A |   | 9/1989 | Shaiper |
| 5,171,066 | A |   | 12/1992 | Klinkhammer et al. |
| 5,407,254 | A | * | 4/1995 | Hegemann ............... 300/21 |
| 6,108,852 | A |   | 8/2000 | Vrignaud et al. |
| D440,404  | S |   | 4/2001 | Naslund |
| 6,286,173 | B1 |  | 9/2001 | Briones |
| 6,402,494 | B1 |  | 6/2002 | Lanvers |
| 2001/0014991 | A1 |  | 8/2001 | Halm et al. |
| 2004/0177462 | A1 | * | 9/2004 | Brown et al. ............ 15/167.1 |

FOREIGN PATENT DOCUMENTS

| DE | WOA9802062 | 1/1998 |
| DE | 10219516 | 11/2003 |

(Continued)

*Primary Examiner*—Joseph S Del Sole
*Assistant Examiner*—Robert Dye
(74) *Attorney, Agent, or Firm*—Nora Stein-Fernandez; Theodore R. Furman

(57) ABSTRACT

A process for making a toothbrush head comprising widthways adjacent sections, the process comprising the stages of first making the head in an injection moulding process with the sections relatively spaced apart from each other in a widthways direction, then secondly moving the sections of the so formed head relatively spaced closer to each other in a widthways direction. An apparatus for performing the process is also disclosed.

4 Claims, 7 Drawing Sheets

FOREIGN PATENT DOCUMENTS

| | | |
|---|---|---|
| FR | 1 247 433 | 10/1959 |
| FR | 2 548 528 | 1/1985 |
| WO | WO 93/08889 | 5/1993 |
| WO | WO 00/76370 | 12/2000 |
| WO | WO 01/89344 | 11/2001 |
| WO | WO 2004/041023 | 5/2004 |
| WO | WOA2004041023 | 5/2004 |

* cited by examiner

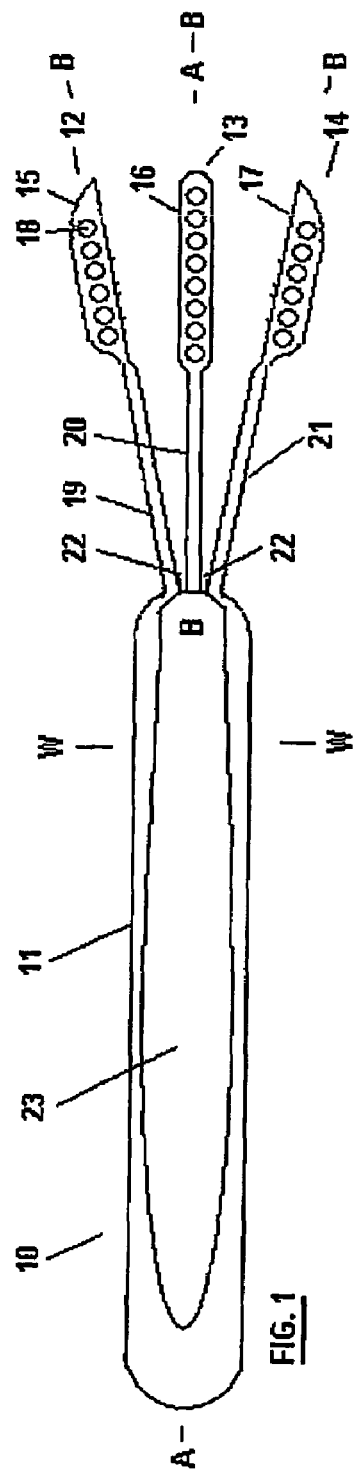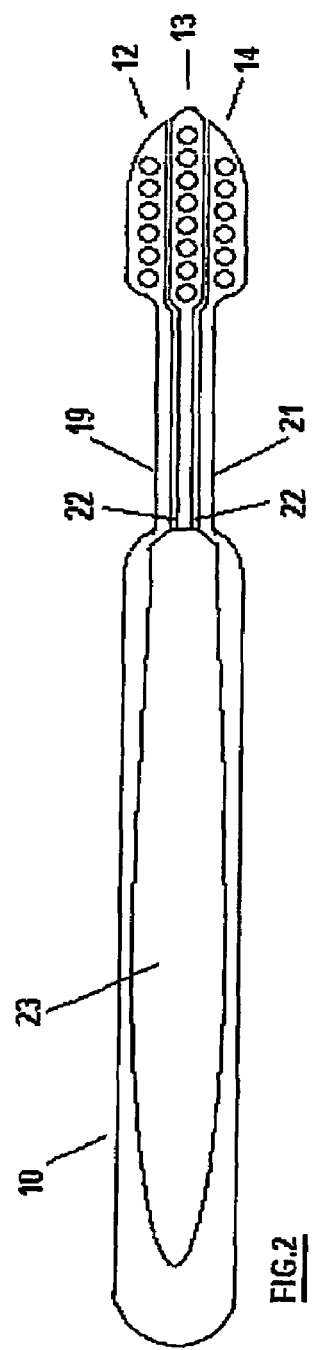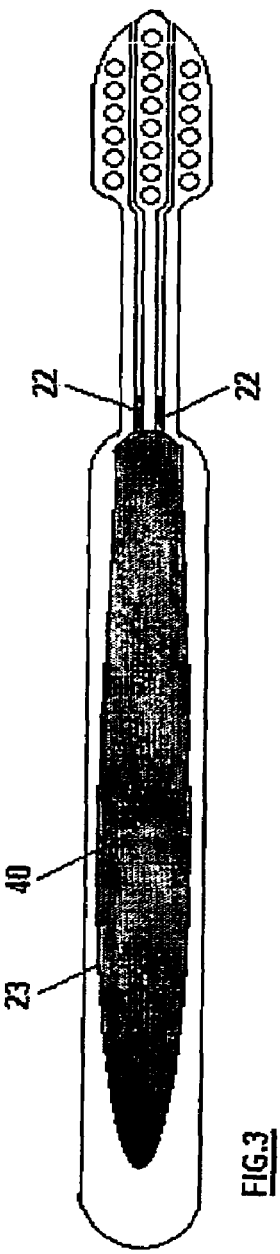

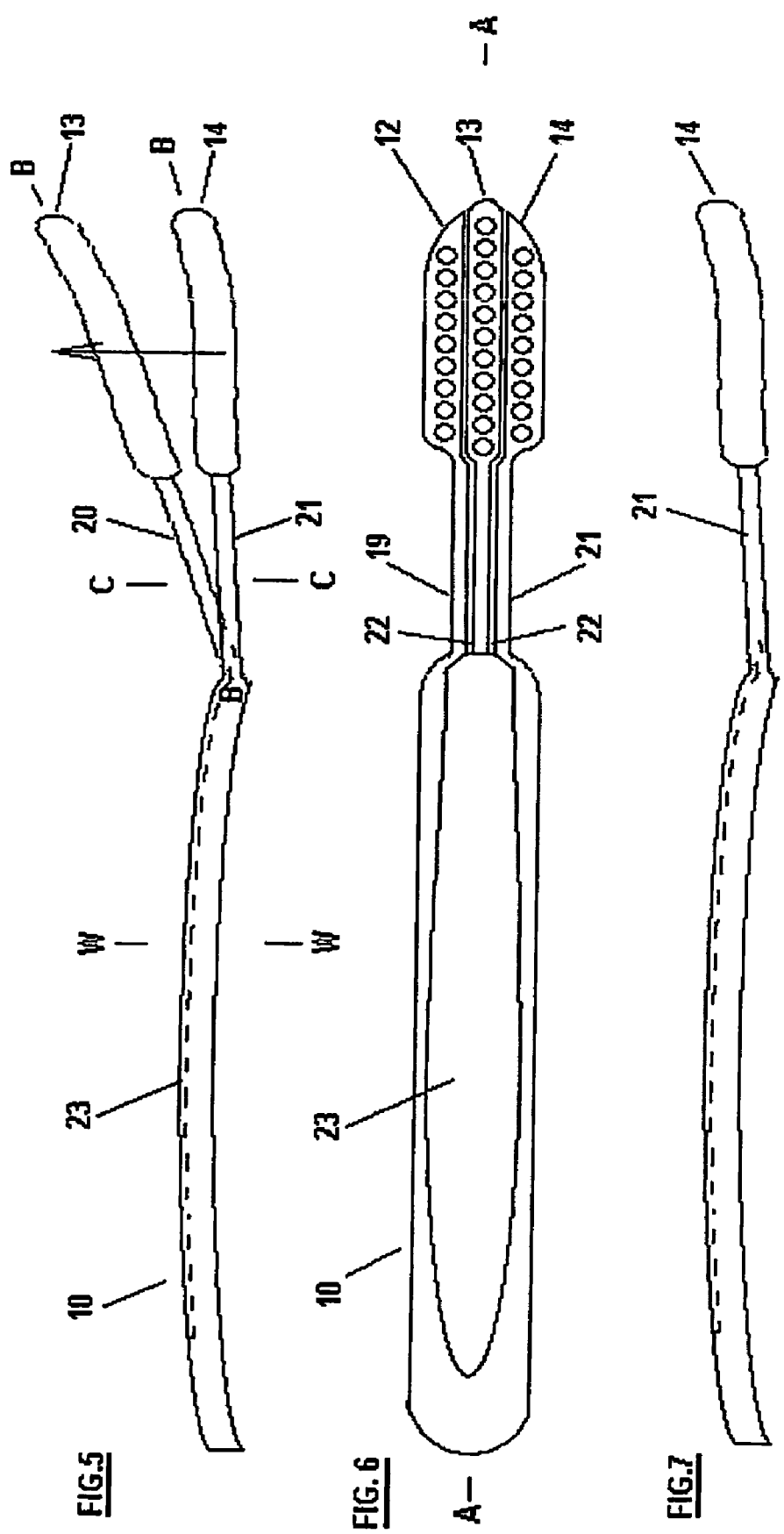

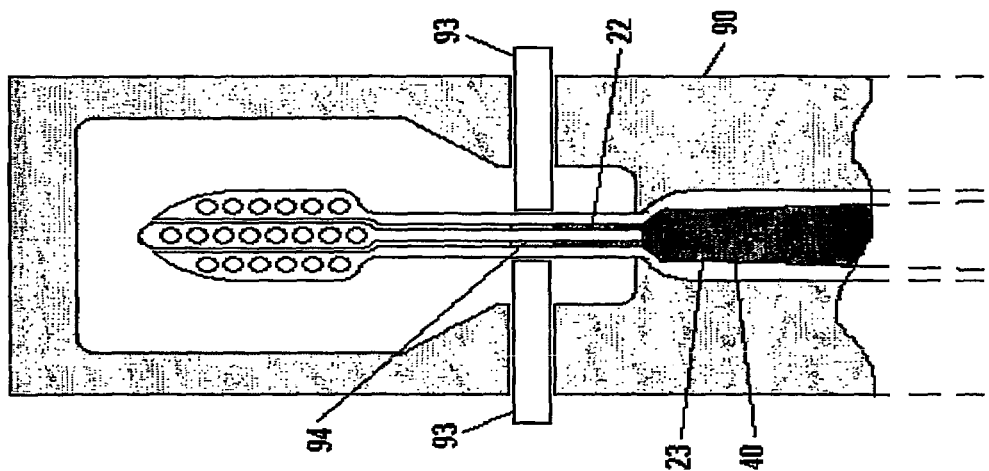
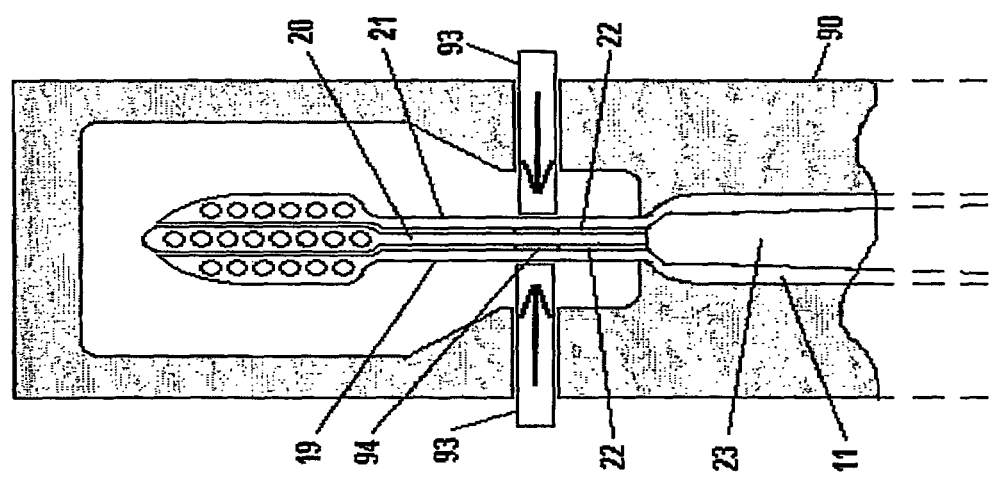
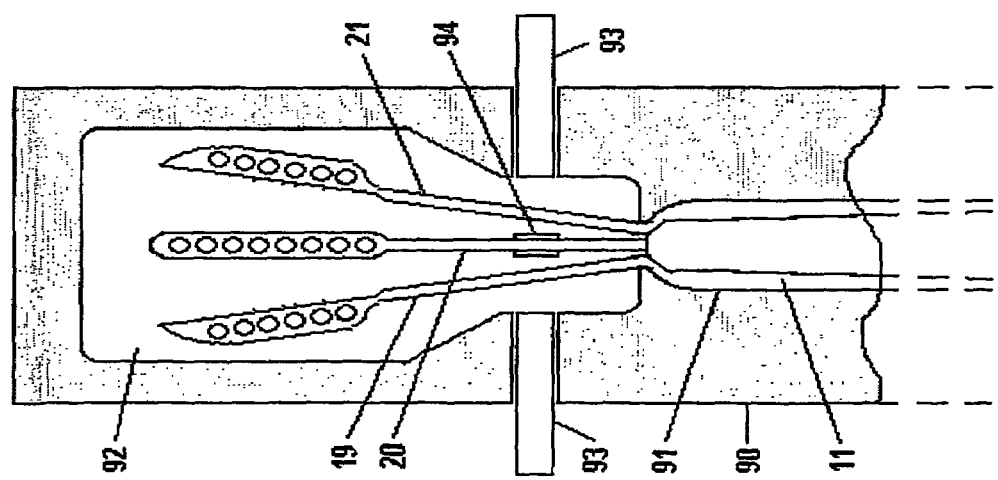

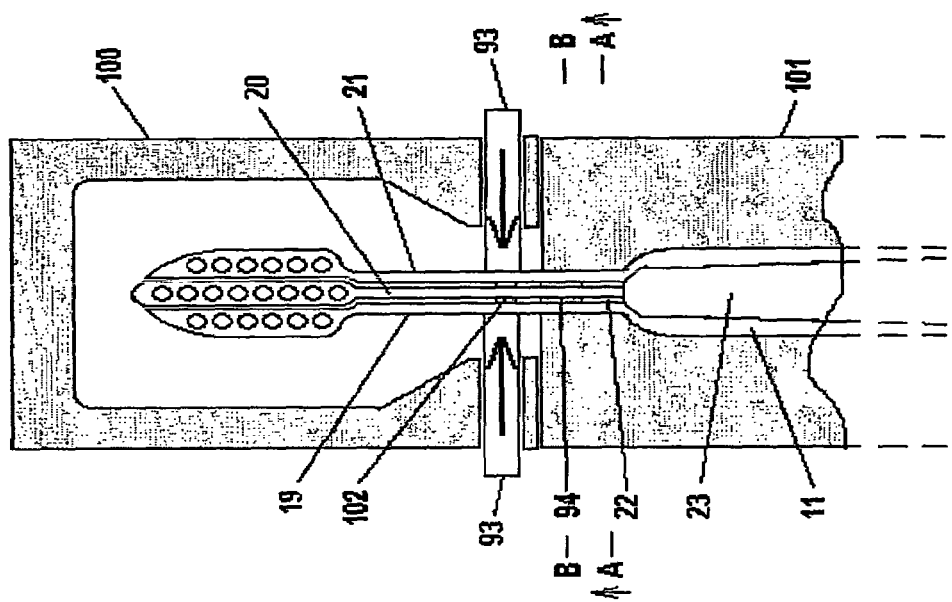
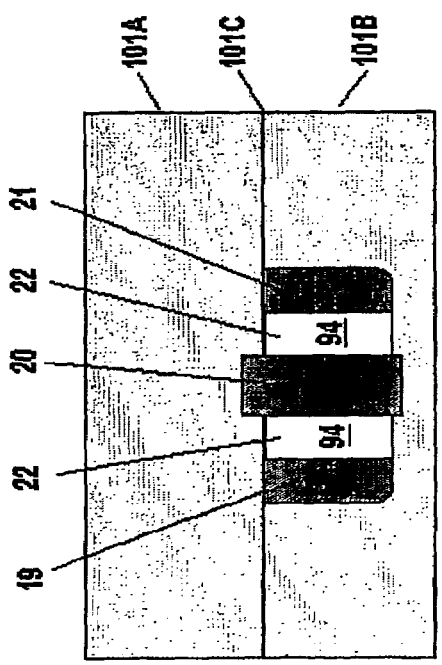
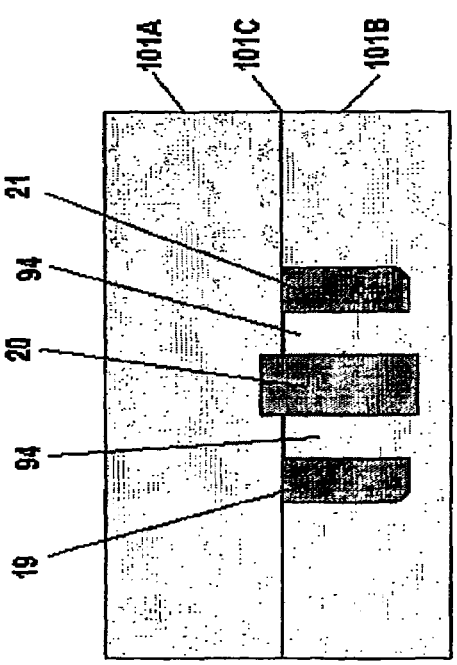

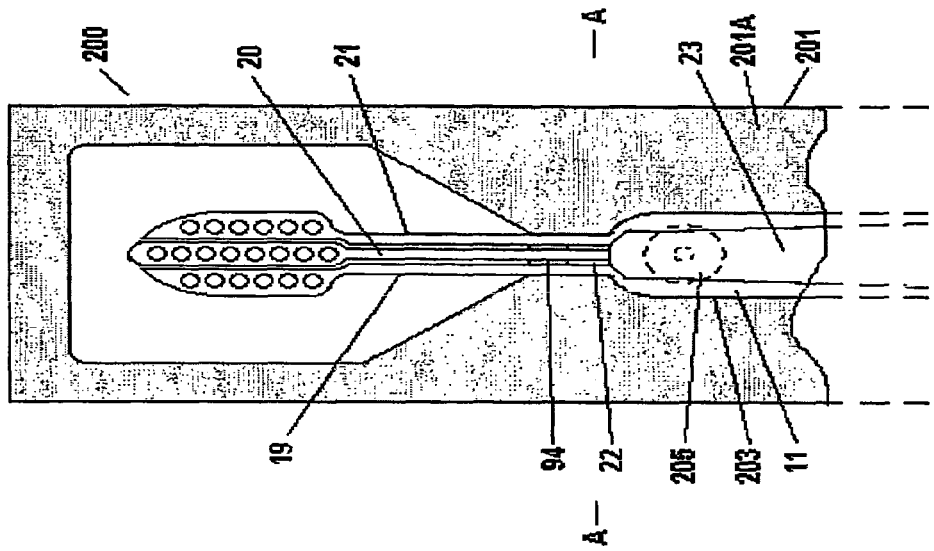
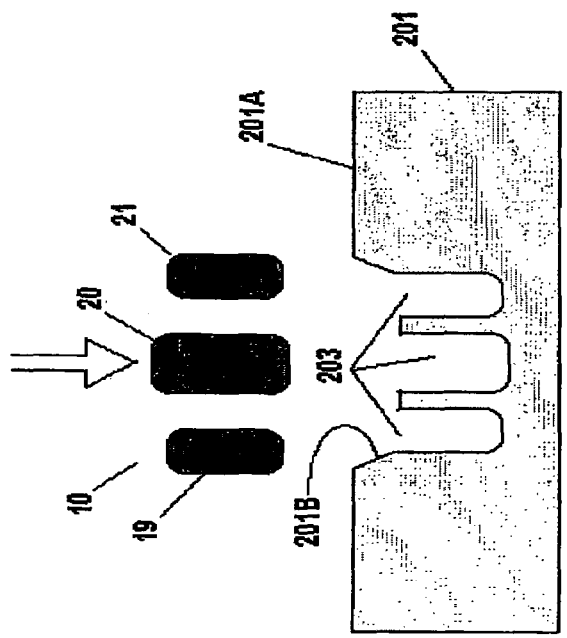
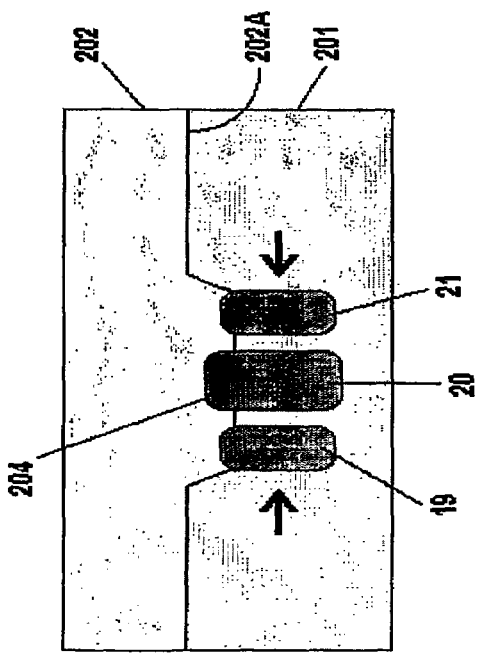

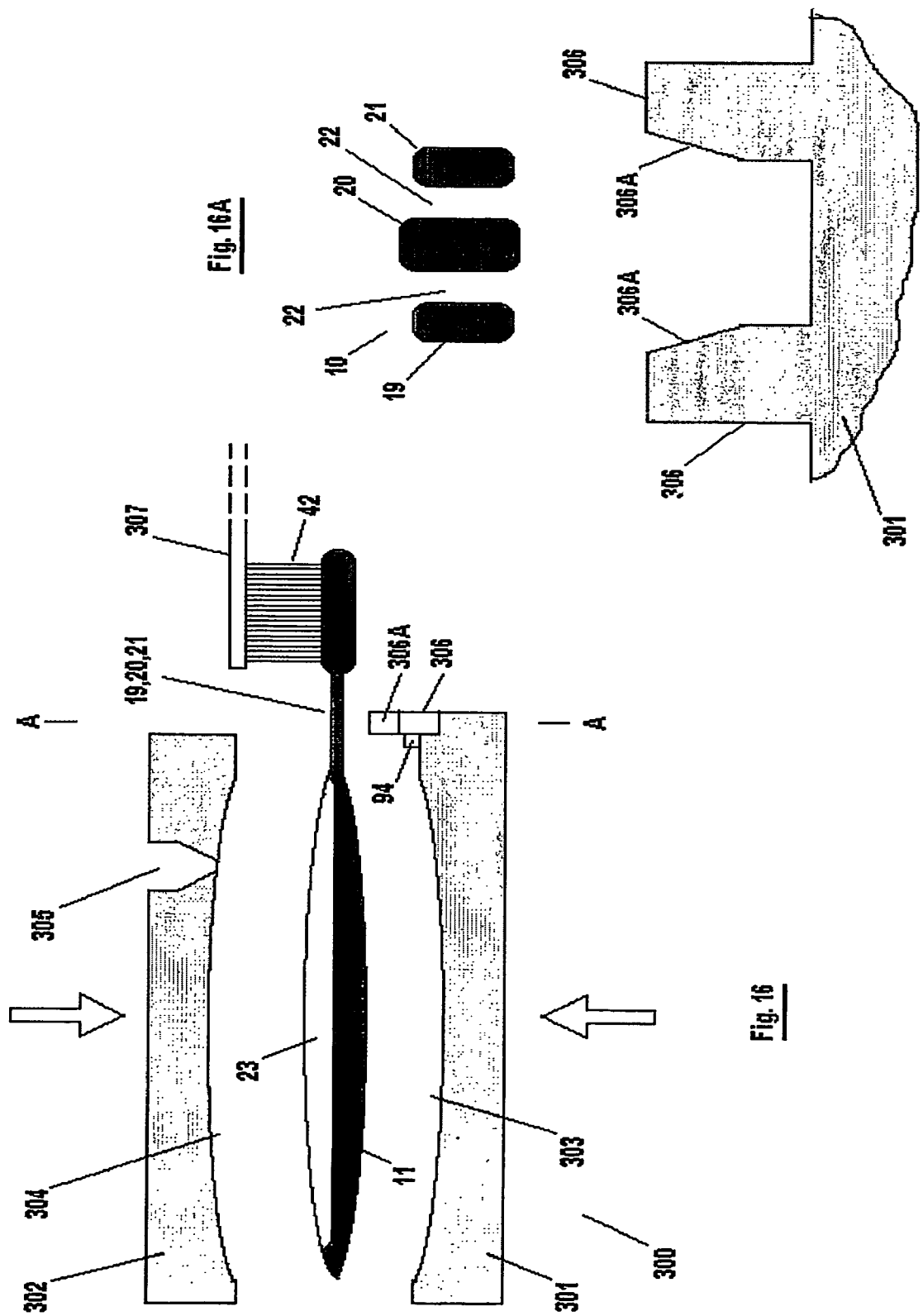

PROCESS FOR MAKING TOOTHBRUSHES

This application is a §371 National Phase entry of international application No. PCT/EP2004/012062, filed Oct. 22, 2004.

This invention relates to processes for making toothbrushes.

Toothbrushes are well known articles and generally comprise a head from which bristles extend in a bristle direction, the head being connected to (or connectable to in a replaceable head toothbrush) a grip handle, the toothbrush being elongate, the head and handle being disposed along a toothbrush longitudinal direction. Generally there is a thinned neck region longitudinally between the head and handle.

A particular type of toothbrush has a head which comprises at least two, typically three, sections which carry bristles and are disposed widthways adjacent, each section comprising a neck which flexibly links the section to the grip handle, and is integrally made with the brush handle. Toothbrushes of this general type are disclosed for example in US-D-440,404, U.S. Pat. No. 4,864,676, U.S. Pat. No. 4,472,853, U.S. Pat. No. 1,323,042, FR-A-1,247,433, FR-A-2,548,528, WO-A-98/02062, WO-A-01/89344 and WO-A-2004/041023.

Toothbrushes are almost always made by an injection moulding process in which hot fluid plastic material is injected under pressure into a mould cavity which is accurately internally shaped to define the corresponding shape of the toothbrush formed in the mould.

It is well known in the toothbrush art to make toothbrushes comprising two materials, typically by firstly making a hard plastic material (e.g. polypropylene) "skeleton" comprising the hard plastic part of the head, handle and any neck region between the head and handle, then enclosing this skeleton in a mould cavity and injecting in a second material, typically a thermoplastic elastomer material. The skeleton incorporates one or more void into which the second material flows during injection.

There is consequently a problem when such a mould is used to make the skeleton particular type of toothbrush described above in which the sections are to be close together widthways typically touching in sliding contact with each other. The gap between the sections is defined by a dividing wall in the mould between the parts of the cavity in which the adjacent sections are to be moulded. If the desired spacing between the sections is small the dividing wall between these parts of the mould is relatively thin e.g. less than 0.5 mm and can consequently distort or break under the pressures experienced during injection moulding.

WO-A-00/76370 discloses a toothbrush of this type in which the head, neck and handle are made in two longitudinally split halves which are then connected together at the handle so that the head remains in the form of two independently flexible moveable sections. This process disadvantageously requires a mould cavity to make each half of the toothbrush, adding to initial mould costs or reducing the capacity of production.

Abovementioned WO-A-2004/041023 discloses a process for making its toothbrush head, in which the two sections are moulded a predetermined distance apart, then heated, then moved towards each other.

It is an objective of this invention to provide a process by which toothbrushes of the particular type described above may be made with a small space between sections without risk of distortion of the mould during injection of the plastic material into the injection mould.

According to this invention a process for making a toothbrush head of the type comprising at least two sections widthways adjacent to each other on opposite sides of a toothbrush longitudinal direction, the sections being flexibly integrally linked to each other, is provided, the process comprising the stages:

firstly making the head in an injection moulding process with the sections flexibly integrally linked to each other and relatively spaced further apart from each other in a widthways direction, secondly moving the sections of the so formed head relatively closer to each other in a widthways direction.

The process may be one in which the sections comprise a head part adapted to carry bristles, e.g. provided with bristle holes into which bristle tufts may subsequently be fixed, and a neck part via which the section is integrally linked to the toothbrush handle and consequently via which the sections are linked to another section. Suitably each such neck part is linked to the head part at one longitudinally disposed end and linked to the handle at a longitudinally opposite end. Such a neck part may be flexible, and/or the link between the neck part and the head part of the section, or between the neck part and the handle may be flexible. The flexible linking is preferably resiliently, i.e. springy, flexible linking as may be achieved by integral construction from the types of resilient plastics materials commonly used for toothbrushes.

In the first stage of the process a part of the toothbrush may be made, the part comprising the sections, suitably each section comprising a head part and neck part, and a grip handle or part thereof. Such a part of the toothbrush may be a "skeleton" as mentioned above.

When the sections are moved relatively closer together in the process a distortion of the integral link may occur at the junction between the head part of the section and the neck part, at the junction between the neck part and the handle, or at any other position of the neck part.

In the first stage of the process the sections may be spaced apart with their respective longitudinal directions, i.e. the direction between the part of the section closest to the handle and the part of the section furthest from the handle, diverging with increasing longitudinal distance of the section from the handle, i.e. so that the section splays progressively with this longitudinal distance, so that the longitudinal directions of the sections diverge in the direction away from the handle with a non zero angle relative to the toothbrush longitudinal direction, for example 1 to 45°, e.g. 1 to 5°. Then in the second stage of the process the sections may be moved relatively closer to each other in a widthways direction so that as a result the angle of divergence lessens.

When sections comprise a neck part by which the sections are integrally linked to the handle the neck parts also may be made relatively spaced apart in a widthways direction, e.g. so that the neck parts splay in the above-described manner, and the neck parts may also then be moved relatively closer together.

The sections may be spaced apart in a widthways direction which is perpendicular to the bristle direction, i.e. the direction in which the bristles are to be aligned when fitted into the head part. Generally the head of a toothbrush has a plane surface from which the bristles extend, and this widthways direction may be parallel to this plane and perpendicular to the longitudinal direction of the section.

For example there may be three sections being a middle and two widthways outer sections, and the outer sections may splay in this widthways direction progressively with the longitudinal distance, so that the longitudinal directions of the sections diverge with progressive distance in the direction away from the handle with a non zero angle relative to the toothbrush longitudinal direction.

Additionally or alternately the sections may be spaced apart in a widthways direction which is parallel to the bristle direction. This widthways direction may be perpendicular to the above-mentioned plane and perpendicular to the longitudinal direction of the section.

Additionally or alternatively the longitudinal directions of three or more sections may be spaced apart so that they diverge about a solid angle, e.g. to lie on the surface of a constructed cone or pyramid with its projected apex pointing in the head-towards-handle direction.

When the sections are relatively spaced closer together as a result of the second stage of the process, they may be relatively spaced closer together so that the respective longitudinal directions of the sections are parallel or converge with increasing longitudinal distance away from the handle. For example there may be a widthways gap between the sections in the relatively spaced closer together configuration, and the widthways dimension of this gap may narrow with increasing longitudinal distance away from the handle.

Suitably with the sections spaced relatively closer to each other the sections of the toothbrush head may be in a position corresponding to their position for use in the final product toothbrush.

The process of the invention enables toothbrush heads to be made in which after the sections are moved to be spaced closer together they are separated by a widthways gap of less than 0.5 mm, preferably less than 0.2 mm, preferably so that they are in contact with each other. Flexible sections in contact with each other may be touching in sliding contact with each other. When the sections are spaced relatively far apart their furthest spaced apart parts are spaced further apart than these distances, e.g. 0.5 mm or more apart. When the sections are spaced closer together some parts of the sections may be closer together than other parts of the sections, for example part of the sections may be in contact whilst another part of the sections may be spaced apart.

For example adjacent to the grip handle there may be a widthways gap between the sections but longitudinally further away from the grip handle the sections may be in contact.

The toothbrush head may be made of a thermoplastic material and the sections are moved closer together with the material in a hot malleable state. Suitable thermoplastic plastics materials of which the toothbrush head and handle may be made in the process of this invention include conventional materials of which toothbrushes are made including polypropylene, polyamides etc., which may for example be fibre-reinforced e.g. polyester fibre reinforced to modify flexibility, are well known in the toothbrush art. Suitable softening temperatures for these types of materials are known in the art. Injection moulding processes normally involve injection of a plastic material in a hot fluid state under pressure into the mould cavity, followed by opening the mould and ejecting the moulded product, e.g. using ejector pins, when it has cooled sufficiently to be robust, but may still be hot.

When made of the materials above-mentioned the sections, e.g. head parts and neck parts of the sections, may be flexible enough that even when the sections have cooled after removal from the mould, they can easily be moved closer together because of their inherent resilience.

However the material of the sections may be provided in a hot malleable state by performing the moving of the sections closer together shortly after the head has been removed from the mould used in the moulding process of the first stage so that the material is still in a hot malleable state after the injection moulding stage.

Alternatively the head may be heated to render the material malleable, e.g. with a jet of hot gas, microwave heating or heat or radiation (e.g. laser) radiation directed at the head. Suitably such heating is localised to one or more specific area of the toothbrush, for example the junction between a neck part and the handle, or the handle part of a toothbrush skeleton.

After the sections have been moved closer together they may be fixed in this closer together relationship. For example if the sections are moved closer together with the material in a hot malleable state the sections may be fixed in this relationship by cooling the material or allowing the material to cool after the sections have been moved closer together so that the material sets rigid.

Additionally or alternatively the sections may be fixed by injecting a second fluid plastic material around and/or between a part of the sections, in particular a region of a flexible neck part particularly a region adjacent to the grip handle, and causing or allowing this second fluid material to set to thereby fix the sections in their closer together relationship.

In such an embodiment of the process, in the first stage of the process a toothbrush skeleton may be made having the sections in the spaced widthways further apart configuration, then in the second stage of process the sections may be moved relatively closer to each other in a widthways direction, then the sections may be fixed in their closer together configuration by injecting a second fluid plastic material around and/or preferably between a part of the sections and causing or allowing this second fluid material to set to thereby fix the sections in their closer together relationship.

In particular such a part of a section may be a region of a flexible neck part particularly a region adjacent to the grip handle, for example a gap between neck parts of sections, adjacent to the grip handle.

Suitably such a skeleton may have one or more void in its structure defining the shape and position of an intended second material part into which a second fluid plastic material may be injected. Such a void may comprise or be in communication with a gap between sections.

Such a second plastic material may be a hard plastics material such as polypropylene or polyamide etc., or may be a thermoplastic elastomer (TPE) material such as the known Evoprene™ or Santoprene™ materials conventionally used in two component toothbrushes e.g. for grip pads. Such materials are known which can bond to the plastics materials of which toothbrushes are made.

Additionally or alternatively the sections may be fixed into their closer together relationship by a weld, such as an adhesive, thermal or ultrasonic weld between adjacent sections, e.g. between adjacent flexible neck parts.

Additionally or alternatively adjacent sections may be provided with mechanical locking features, e.g. interlocking parts, which engage when the sections are moved into their closer together relationship.

Bristles may be inserted into the toothbrush head of the present invention using generally conventional processes. For example the head part may be made in the injection moulding process provided with holes for the insertion of bristle tufts, and bristle tufts may be then fixed into these holes. Alternatively for example bristles may project into the mould cavity in which the head part is formed, so that the bristles become set in the solidified head material.

The invention also provides a toothbrush head and a toothbrush as a product when made by such a process.

Such a toothbrush head comprises at least two sections widthways adjacent to each other on opposite sides of a toothbrush longitudinal direction, the sections being flexibly integrally linked to each other at their ends closest to the grip handle wherein the sections of the so formed head are relatively close to each other in a widthways direction.

Preferably the sections comprise a head part adapted to carry bristles, and a neck part via which the section is integrally linked to the toothbrush handle and consequently to another section. Such a neck part may be flexible, and/or the link between the neck part and the head part of the section, or between the neck part and the handle may be flexible. The flexible linking is preferably resiliently, i.e. springy, flexible liking as may be achieved by integral construction with the types of plastics materials commonly used for toothbrushes.

Preferably in the completed toothbrush the sections relatively closer together are separated by a widthways gap of less than 0.5 mm preferably less than 0.2 mm, preferably so that they are in sliding contact with each other.

The sections in this closer together relationship may be fixed in this relationship by means of a second fluid plastic material around and/or between a part of the sections, in particular a region of a flexible neck part particularly a region adjacent to the grip handle. Such a second plastic material may be a hard plastics material, or may be a thermoplastic elastomer (TPE) material as discussed above. Additionally or alternatively the sections may be fixed into their closer together relationship by a weld, such as an adhesive, thermal or ultrasonic weld between adjacent sections, e.g. between adjacent flexible neck parts. Additionally or alternatively adjacent sections may be provided with mechanical locking features, e.g. interlocking parts, which engage when the sections are moved into their closer together relationship.

The invention also provides an apparatus for performing the process of the invention, the apparatus comprising:

an injection moulding means adapted to make a toothbrush head of the type comprising at least two sections widthways adjacent on opposite sides of a toothbrush longitudinal direction, with the sections flexibly integrally linked to each other and relatively spaced apart in a widthways direction;

and means to move the sections of the so formed head relatively closer.

The invention also provides an apparatus adapted to be supplied with a toothbrush head (which may be without its bristles, e.g. having bristle holes for subsequently inserting bristles therein, and may be the head parts of a skeleton as described herein) of the type comprising at least two sections widthways adjacent on opposite sides of a toothbrush longitudinal direction, the sections being flexibly integrally linked to each other, with the sections flexibly integrally linked to each other and relatively spaced apart in a widthways direction, the apparatus being adapted to move the sections of the head relatively closer together.

In a preferred process and apparatus of this invention the apparatus adapted to be supplied with a toothbrush head comprises a holder for the toothbrush head and preferably also the toothbrush handle and within which the toothbrush head may be contained whilst the sections are moved into their closer together relationship, and which may also define a mould cavity into which a second fluid plastic material may be injected as described above. Such a holder is used for supporting the pre-moulded skeleton, moving the sections closer together, and for injecting a second plastic material.

Such an apparatus is preferably adapted to receive a skeleton of a toothbrush having such a head, wherein the sections comprise a head part and a neck part between the head part and the handle part.

Such an apparatus adapted to receive such a skeleton may comprise first and second part moulds which can mate together and which incorporate first and second part mould cavities which when the first and second part moulds have mated together form a mould cavity capable of receiving at least part of the skeleton, particularly the grip handle part and the neck part of the sections immediately adjacent to the grip handle part, and the apparatus incorporates one or more abutment surface positioned relative to the apparatus such that as the part of the skeleton and a part mould cavity relatively come together, one or more abutment surface abuts against at least one of the sections to urge the sections into the closer spaced together relationship.

In an embodiment such an abutment surface may be provided by one or more of the part mould cavities having a ramp profiled abutment surface so that as a section is received by the part mould cavity, the ramp profiled surface abuts against the section to urge the section toward the closer spaced together relationship.

Additionally or alternatively, in an embodiment such an abutment surface may be provided by a mould cavity capable of receiving the grip handle part and the neck part of the sections immediately adjacent to the grip handle part, but such that the head part of the section and the neck part of the section adjacent the head part extends outside of the part mould cavity, and an abutment surface may be provided outside of a part mould cavity and positioned so that a section and the abutment surface may be brought into contact before the part moulds mate so that the abutment surface abuts against the section to urge the section toward the closer spaced together relationship.

For example in this embodiment such an abutment surface may be rigidly connected to or part of a part mould, and may extend across the mould split line. For example such an abutment surface may be positioned such that the abutment surface abuts against the section as the skeleton is received by a part mould cavity. For example such an abutment surface may be positioned such that the abutment surface abuts against the section as the part moulds mate so that the skeleton is received by the so-formed mould cavity.

In the field of toothbrush manufacture such two part moulds are commonly used. A part mould of such an apparatus may be provided with an injection port to inject a second plastic material such as a thermoplastic elastomer into the mould cavity, and profiled such that when such a second plastic material is injected it flows into around or between the sections, suitably via a void in a toothbrush skeleton therein.

The invention will now be described by way of example only with reference to the accompanying drawings.

FIG. 1 shows a plan view of a skeleton of a toothbrush with its sections splayed apart.

FIG. 2 shows a plan view of the skeleton of FIG. 1 after its sections have been moved closer together.

FIG. 3 shows the skeleton of FIG. 2 after a second component material has been injected in.

FIG. 5 shows a side view of a skeleton of a toothbrush with its sections splayed apart.

FIG. 6 shows a plan view of the skeleton of FIG. 5.

FIG. 7 shows a side view of the toothbrush skeleton of FIG. 5 after its sections have been moved closer together.

FIGS. 9-11 show the construction and operation of a holder.

FIG. 12 shows an alternative construction of a holder and an injection mould for making a toothbrush.

FIGS. 13 and 14 show an alternative construction of an apparatus of this invention.

FIG. 16 shows another alternative construction of an apparatus of this invention.

Figure 4:
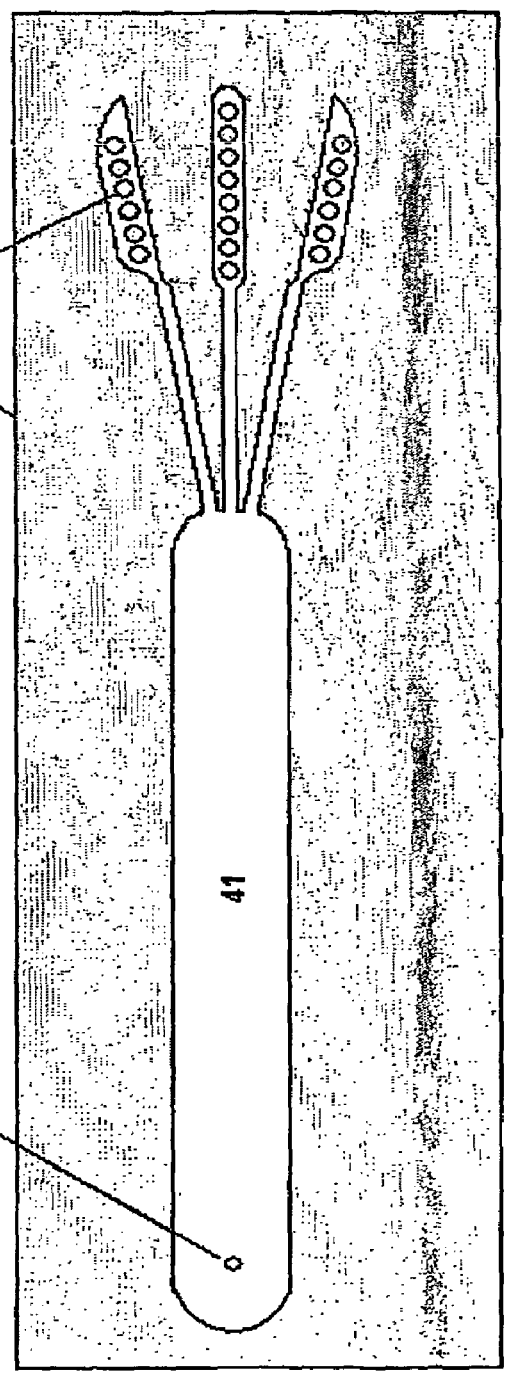
FIG. 4 shows a plan view of part of an injection mould suitable for making the skeleton of FIG. 1.

Referring to FIGS. 1-3, as seen in FIG. 1 a skeleton 10 (overall) of a toothbrush comprises a grip handle 11 integrally formed with three sections 12, 13, 14 made using a generally conventional injection moulding process. Each section 12, 13, 15 comprises a respective head part 15, 16, 17 in which are formed bristle tuft holes 18 during the moulding process, using conventional bristle pins (not shown) projecting into the mould cavity in which the head parts 15, 16, 17 have been made, to form holes 18. Each section 12, 13, 14 also comprises a respective resiliently flexible neck part 19, 20,21 integral with the head part 15, 16, 17 and the handle 11. The skeleton 10 has a head-handle toothbrush longitudinal direction A-A, with a widthways direction denoted W-W. The view in FIG. 1 is a plan view looking down the bristle direction, i.e. the direction in which bristles will extend when they are fixed into the head part 15, 16, 17.

As seen in FIG. 1 the toothbrush 10 is shown as made in an injection moulding process with the sections 12, 13, 14 relatively spaced apart in a widthways direction, As shown the sections 12, 13, 14 are splayed apart so that the respective longitudinal directions B-B of the outer sections 12, 14 diverge from the longitudinal direction of the middle section 13, with increasing longitudinal distance of the section 12, 14 from the handle 11, i.e. splaying progressively with this longitudinal distance, so that the longitudinal directions B-B of the sections 12, 14 and their flexible neck parts 19, 21 diverge in the direction away from the handle 11 with an angle ca. 10° to the longitudinal direction A-A. In FIGS. 1, 2 and 3 the surface of each head part 15,16,17 from which bristles are to extend is flat, and the sections 12,13,14 splay in a plane parallel to the plane of the head parts 15,16,17.

It will be appreciated that in such a mould there need be no thin dividing wall between the respective mould cavities in which the sections 12, 13, 14 are formed by injection moulding. At their closest together point, where the sections 12, 13, 14 meet the handle 11 the gaps 22 between the neck parts 19, 20, 21 may be 0.5 mm or more. As shown in FIG. 1 the three sections 12, 13, 14 all lie substantially in a plane perpendicular to the bristle direction.

As seen in FIG. 2 the toothbrush 10 with its sections 12, 13, 14 has been removed from the injection mould (see FIG. 4) in which it was formed, and the sections 12, 13, 14 and their respective neck parts 19, 20, 21 have been moved relatively closer together. This has been achieved by applying pressure to the outermost sections 12 and 14 to cause them to swing inwardly. This can be by distortion at the integral junction between the neck parts 19, 21 and the toothbrush handle 11, or by gradual distortion along the length of the neck sections 19,21, the gap between the sections 12, 13, 14 is shown exaggerated for clarity, and part of the sections 12, 13, 14, particularly the head parts 15, 16, 17, may be touching in contact. Because the neck parts 19, 20, 21 are thin enough to be resiliently flexible there can be relative movement between the sections 11, 12, 13 so that this contact is sliding contact.

This pressure may be applied by suitable contact parts (not shown) e.g. inward pressing jaws, pistons, or other inwardly moveable parts applying inward pressure to the neck parts 19, 21, or by bringing the neck parts 19,21 into contact with abutment parts to urge them inwardly. During this operation the toothbrush skeleton 10 may be held in a second mould cavity (not shown) into which the skeleton 10 fits, and which incorporates the inwardly moveable parts. The outer surface of the skeleton includes a cavity 23 which is to contain and define the shape of the second plastic material subsequently to be injected.

As shown in FIG. 3 a second material being a thermoplastic elastomer material 40 has been injected into the cavity 23 in the skeleton 10. The second material 40 has also flowed a short longitudinal distance into the gaps 22 between neck parts 19, 20, 21 under known injection conditions such that the plastics material of the skeleton 10, including the neck parts 19, 20, 21 bonds with the elastomer material 40.

FIGS. 9, 10 and 11 show how the injection of the second material 40 may be achieved with the handle part 11 and the immediately longitudinally adjacent part of neck parts 19, 20, 21 of the skeleton 10 contained within a second mould cavity which incorporates bulkheads 94 which fit into the gaps 22 and define the extent to which the material 40 can flow longitudinally along the gaps 22. The elastomer material 40 is injected into the second mould cavity in a hot fluid state and subsequently sets to thereby hold the neck parts 19, 20, 21 in their closer together state.

In a modification of this process inward pressure may be applied to the outer neck parts 19, 21 whilst they, or the integral junction between the neck parts 19, 21 and the toothbrush handle 11, are hot and plastically malleable so that as they subsequently cool they remain in the closer together relationship of FIG. 2. For this modification the neck parts 19, 21 or the integral junction with the handle 11 may be locally heated e.g. with a jet of hot air.

Figure 4A:
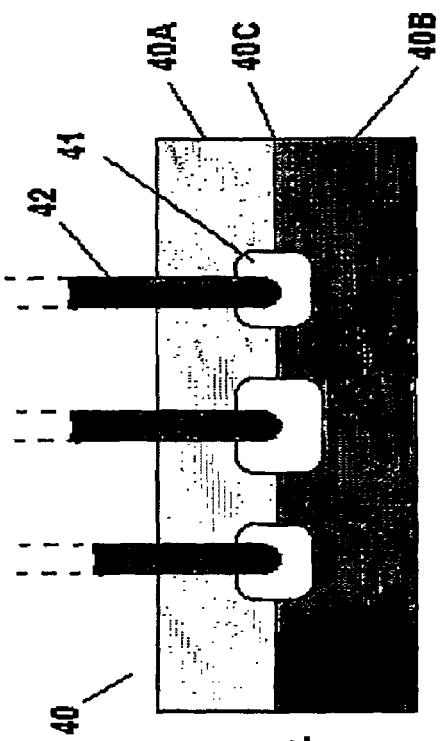

Referring to FIG. 4 a plan sectional view of part 40 of an injection mould is shown. This is made conventionally of precision steel using a conventional spark erosion process. The mould 40 includes a mould cavity 41 corresponding to the shape of skeleton 10 of FIG. 1. In the parts of the cavity 41 corresponding to the head parts 15, 16, 17 bristle pins 42 extend to form the bristle holes 18. There is a conventional injection port 43 through which hot fluid plastics material may be injected under pressure. FIG. 4A shows a cross section through mould 40 at line A-A. It is seen that the mould 40 comprises mating upper 40A and lower 40B parts which mate conventionally at split line 40C. It is seen how the cavity 41 defines the shape of the three further spaced apart head parts 13,13,15 of FIG. 1. Retractable pins 42 define the shapes and positions of the holes 18 into which bristle tufts are to be inserted. As is common practice in toothbrush manufacture the skeleton 10 formed in such a mould may be subsequently manipulated by an arm, termed an "index plate" attached to the bristle pins 42 and which can manipulate the skeleton 10 holding it by the bristle pins retained in holes 18. when the sections 12,13,14 are subsequently moved closer together the bristle pins 42 in the outer sections 12,14 should be removed to allow this movement.

It can be seen that between the three parts of cavity 41 the intervening metal part of the mould 40 is relatively thick. The mould 40 incorporates other conventional features of a toothbrush skeleton injection mould, e.g. ejector pins (not shown).

Referring to FIGS. 5, 6 and 7, FIG. 5 shows the plastics material skeleton of a toothbrush 10 in a sideways view looking perpendicular to the bristle direction, i.e. the direction designated by an arrow in which bristles (not shown) will be aligned when bristles are fixed into the head parts 15, 16, 17. A longitudinal direction is denoted A-A, and a widthways direction is denoted W-W. As seen in FIG. 5 the toothbrush 10 is shown as made in an injection moulding process with the middle section 13 spaced apart in a widthways direction parallel to the bristle direction from the two outer sections 12, 14. As shown in FIG. 5 the sections 12, 13, 14 are splayed apart so that the respective longitudinal directions B-B of the sections 12, 13, 14 diverge with increasing longitudinal distance of the section 12, 13, 14 from the handle 11, i.e. splaying progressively with this longitudinal distance, so that the longitudinal directions B-B of the sections 12, 13, 14 and their flexible neck parts 19, 20, 21 diverge in the direction away from the handle 11 with an angle ca. 15° to the longitudinal direction. FIG. 6 shows the same skeleton in a plan view.

As seen in FIG. 5 the outer sections 12, 14 are substantially in a plane perpendicular to the bristle direction, and the middle section 13 is displaced above this plane. The sections 12, 13, 14 are consequently seen to be splayed by a solid angle, i.e. with their longitudinal directions lying on the surface of a pyramid.

As seen in the side view of FIG. 7 the toothbrush skeleton 10 with its sections 12, 13, 14 has been removed from the injection mould 70 in which it was formed, and the sections 12, 13, 14 have been moved relatively closer together, i.e. into a relationship corresponding to FIG. 2. This has been achieved by applying pressure to the middle neck part 13 downwardly causing distortion to the integral junction between the neck part 13 and the handle 11 such that the middle section 13 moves closer in the widthways direction e.g. in the bristle direction to the outer sections 12, 14. Simultaneously if necessary inward pressure may be applied to the outer neck parts 19, 21 to move the outer sections 12, 14 closer to the middle section 13.

This pressure may be applied by a suitable downwardly moveable pressure part (not shown) applied to the middle section 13. Analogously with FIG. 2 during this operation the toothbrush 10 may be held by a holder which incorporates the downwardly moveable pressure part.

Analogously to FIG. 3 a second material 40 being a thermoplastic elastomer material may be injected into the cavity 23 in the handle 11 and allowed to flow into gaps 22 between the neck parts 19, 20, 21 under known injection conditions such that the plastics material of the neck parts 19, 20, 21 bonds with the elastomer material 20. The elastomer material 40 injected into the gaps 22 in a hot fluid state subsequently sets to thereby hold the neck parts 19, 20, 21 and consequently sections 12, 13, 14 in their closer together state. In a modification of this process inward pressure may be applied to the middle neck part 20 whilst it, or the place where it meets the handle 11, is hot and plastically malleable so that as it subsequently cools middle section 20 remains in the closer together relationship.

Figure 8:
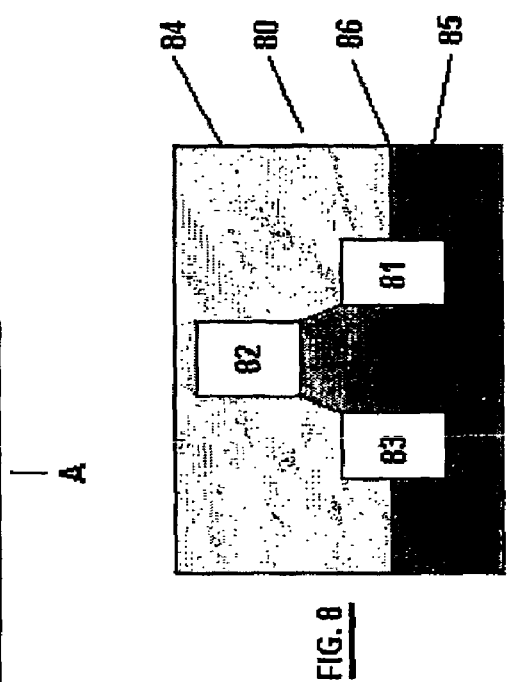
FIG. 8 shows a cross section through part of an injection mould suitable for making the skeleton of FIG. 5.

FIG. 8 shows a cross section through part of the injection mould 80 in which the toothbrush skeleton 10 of FIG. 4 is made showing the arrangement of the mould cavities 81, 82, 83 in which the respective sections 12, 13, 14 are moulded. The mould 80 comprises two part-moulds 84, 85 which are split in a conventional manner at split line 86. FIG. 8 shows the relative separation of the sections 12, 13, 14 at the line C-C, i.e. as cut through the neck parts 19, 20, 21. The injection mould 80 used to make the skeleton 10 may be otherwise conventional in the toothbrush field. It will be appreciated, as seen in FIG. 8 that in such a mould there need be no thin dividing wall between the respective mould cavities 81, 82, 83 in which the sections 12, 13, 14 are formed by injection moulding.

After manufacture using the above-described process bristles may be fixed into the holes 18 using a conventional bristling machine as known in the art. Alternatively bristles may be made set in the head parts 15, 16, 17 using the so-called "anchorless" process in which ends of bristle tufts project into the mould cavity and the plastic material injected in to surround and embed the bristle tufts.

FIGS. 9, 10 and 11 illustrate part of an apparatus by means of which the second stage of the process of the invention may be performed.

FIGS. 9, 10 and 11 show a holder 90 in which a skeleton 10 as shown in FIG. 1 may be held. The holder 90 includes a second mould cavity 91 seen in plan view in FIG. 9 in which the handle part 11 of the skeleton 10 fits and is enclosed between holder 90 and an upper (as seen) holder part (not shown) and which closely contains the handle part 11 so that thermoplastic elastomer material may be subsequently injected in to form a grip pad 40. The enclosing of the toothbrush handle part of a toothbrush skeleton in a mould cavity formed by upper and lower mould parts and formation of an elastomer grip pad 40 in this way is generally conventional in the toothbrush art.

The sections 12, 13, 14 project beyond the part of the holder which contains this cavity 91, into an area 92. Adjacent to area 92 are pistons 93 arranged in the sides of area 92 able to move inwardly to apply inward pressure to the neck parts 19, 21.

As is shown in FIG. 10 the pistons 93 have moved inwardly. Situated in area 92 are bulkhead parts 94 which extend upwardly integrally from the lower surface (not shown) of the area 92 and which fit between the middle neck part 20 and the outer neck parts 19, 21 when the skeleton 10 is inserted into cavity 91. As the neck parts 19, 21 move inwardly under the pressure of pistons 94 they abut against the bulkhead parts 94 so that the gaps 22 enclosed between the neck parts 19, 20, 21 and the bulkhead parts 94, and the upper and lower surfaces of the area 92 adjacent to the neck parts 19, 20, 21 and the bulkhead parts 94 become fluid-tight against the injection of fluid thermoplastic elastomer into the cavity 23 of handle 11 via an injection port (not shown) of generally conventional design feeding into cavity 23.

FIG. 10A shows a sectional view at line A-A through the holder 90 of FIG. 10, looking in the direction of the arrow. The holder 90 is shown to have upper 90A and lower 90B parts which mate together at split line 90C in the manner of a conventional injection mould as used in toothbrush manufacture. The neck parts 19,20,21 in section in their closer spaced together position, and the gaps 22 between them, are shown in cross section. Surfaces of the bulkhead parts 94 are seen, closing the gaps 22. It is seen that between them the parts 19,20,21, the upper and lower parts 90A,90B, and the bulkhead parts 94 fit closely together to form a fluid-tight seal so that fluid elastomer material can flow into gaps 22. FIG. 10B shows a section through holder 90 at line B-B. The handle part 11 is seen in cross section, as is cavity 23. Superimposition of FIG. 10B onto FIG. 10A shows how cavity 23 is in communication with gaps 22 to allow fluid elastomer material injected into cavity 23 to flow into gaps 22.

FIG. 11 shows the situation when the elastomer material 40 has been injected into cavity 23 and has flowed longitudinally along gaps 22 as far as is allowed by bulkheads 94, and has solidified to produce the toothbrush as shown in FIG. 3. the pistons 93 may be withdrawn outwardly to the position shown in FIG. 9, the upper and lower parts of holder 90 separated and the completed toothbrush 10 removed from holder 90 for a subsequent bristling operation.

Referring to FIG. 12, parts corresponding to previous Figures are correspondingly numbered. In FIG. 12 a holder 100 is provided with pistons 93 to urge the parts 19,20,21 into their closer spaced together configuration, and adapted to hold the parts 19,20,21 in this configuration. Holder 100 is also adapted to present the handle part 11 to a separate mould 101. FIGS. 12A and 12B are respectively a sectional view through mould 101 at line A-A looking in the direction of the arrow, and a cross section through mould 101 at line B-B., with parts 19,20,21 in place in the closed mould 101. It is seen that mould 101 comprises mating upper 101A and lower 101B parts which mate at split line 101C. Mould 101 incorporates bulkhead parts 94 which are integral with lower mould part 101B, and their surfaces seen in FIG. 12A close the ends of gaps 22 between parts 19,20,21. In practice the skeleton 10 is received by holder 100 and its parts 19,20,21 are urged together by pistons 93 until parts 19,20,21 abut against spacers 102 which determine a suitable spacing of the parts 19,20,21. Whilst held by holder 100 the handle part 11 is presented to lower part 101B, with bulkhead parts 94 fitting between parts 19,20,21. In FIG. 12A it is seen how the surface of bulkhead part 94 closes gaps 22 so that fluid elastomer material can flow into gaps 22.

Referring to FIGS. 13, 14 and 15 part of an apparatus 200 (overall) suitable for performing the process of the invention is shown. The apparatus 200 comprises first 201 and second 202 parts which mate together, the view of FIG. 13 being a plan view of the surface 201A of part 201, the part 202 having a corresponding mating surface 202A in the manner of a conventional toothbrush injection mould. FIGS. 14 and 15 are cross sections through the apparatus at line A-A of FIG. 13. The first 201 and second part 202 incorporate part mould cavities 203, 204 which mate to form a mould cavity 203,204 into which the grip handle part 11 of the skeleton may fit. Part 202 incorporates integral bulkhead parts 94. Part 201 incorporates abutment parts in the form of the surface 201A of lower part 201 being ramp profiled at the region 201B which generally conically tapers toward the bottom of cavity 203.

In operation, a skeleton 10 with its sections 12, 13, 14 further apart is made in an injection mould. Skeleton 10 is introduced into mould cavity 203. Skeleton 10 may conveniently be manipulated in this operation by leaving bristle pins 42 in bristle holes 18 of middle section 13, and holding the skeleton 10 by these bristle pins 42, but removing the bristle pins 42 from the outer sections 12,14 so they can be moved relative to section 13. In FIG. 14 the neck parts of the sections 19, 20, 20 are shown positioned adjacent to the surface 201A of part 201, the sections 19,20,21 being in their further spaced apart configuration. As seen in FIG. 15 the sections 19,20,21 have been introduced into mould cavity 203, into which they are a smooth but tight fit. As the sections 19,20,21 are introduced into cavity 203 the outer sections 19,21 abut against the ramp surface 201B, and are urged together into the closer spaced together configuration, which they adopt as they reach the bottom of cavity 203. With the sections 19,20,21 in this closer together configuration the part 201 can be mated with part 202 as seen in FIG. 14. Part 202 is provided with an injection port the position of which is shown 205 by which a thermoplastic elastomer material can be injected into the mould cavity 203,204 to then flow into cavity 23 in skeleton 10 and then into gaps 22 between the sections 19,20,20 to fix them together in the closer together configuration.

Referring to FIG. 16 part of an apparatus 300 (overall) suitable for performing the process of the invention is shown. The apparatus 300 comprises first 301 and second 302 part moulds of overall arrangement similar to FIGS. 13, 14, 15 and which mate together in a manner analogous to FIGS. 13,14,15 the view of FIG. 16 being a schematic side view perpendicular to the direction indicated by arrows in which the parts 301, 302 mate together. FIG. 16A is a part section at line A-A of FIG. 16. The first 301 and second part mould 302 incorporate part mould cavities 303, 304 which mate to form a mould cavity 303,304 into which the grip handle part 11 of the skeleton 10 may fit, but such that the head part 15,16,17 of the section and the neck part 19,20,21 of the section adjacent the head part 15,16,17 extends outside of the part mould cavity 303,304. Part 302 incorporates an injection port 305. Parts 301 and 302 incorporate integral bulkhead parts 94 analogous to FIGS. 13,14,15.

Part 301 incorporates abutment parts 306, outside of the mould cavity 303, and which have ramp surfaces 306A, located outside of the mould cavity 303,304. The abutment parts 306 are rigidly fixed to the part 301, and may be integrally made of the same steel block as part 301.

In operation, a skeleton 10 with its sections 12, 13, 14 further apart is made in an injection mould as above. Skeleton 10 is manipulated into a position between the mould cavities 303,304 as shown. Skeleton 10 may conveniently be manipulated in this operation by leaving bristle pins 42 in bristle holes 18 of middle section 13, and holding the skeleton 10 by these bristle pins 42 which extend from a manipulation arm (index plate) 307, but removing the bristle pins 42 from the outer sections 12,14 so they can be moved relative to section 13.

The parts 301,302 are then mated together to enclose handle part 11 of skeleton 10 in cavity 303,304, as with FIG. 13,14,15. As the parts 301,302 approach each other the outer sections 19,21 abut against the ramp surfaces 306A which extend across the split line of the mould, and the sections 19,21 are urged together into the closer spaced together configuration, which they adopt momentarily before the skeleton 10 is received by cavity 303, and before parts 301, 302 meet, so that the neck parts 19,20,21 fit into the mould cavity 303,304 analogously to FIGS. 13,14,15 in their closer together configuration. Thermoplastic elastomer material can be injected into the mould cavity 303,304 via port 305 to flow into cavity 23 in skeleton 10 and then into gaps 22 between the sections 19,20,20 to fix them together in the closer together configuration, analogously to FIGS. 13,14,15.

Thereafter the toothbrush skeletons with their sections 12,13,14 may be further processed in a generally conventional manner. For example toothbrush bristles (not shown) may be inserted into the bristle holes 18 of the skeletons in a conventional manner. For example this may be done using conventional small metal clips to hold plural bristles together in a tuft comprising plural bristles, then inserting such bundles into the holes 18 so that the clips are securely lodged in the holes 18, in a conventional manner.

The invention claimed is:

1. An apparatus adapted to be supplied with a plastics material skeleton of a toothbrush comprising a handle part and at least two sections spaced apart adjacent to each other on opposite sides of a toothbrush longitudinal direction, each section comprising a head part adapted to carry bristles and a neck part by which the head part is integrally connected to the handle, the sections being flexibly integrally linked to each other, the apparatus being adapted to move the head part and the neck part of the sections relatively closer together, the apparatus comprising a mould cavity to contain the handle part and the immediately longitudinally adjacent part of the neck parts, and further comprising means to inject a hot elastomeric material into the mould cavity to flow around and/or between the sections.

2. An apparatus according to claim 1 comprising first and second part moulds which can mate together and which incorporate first and second part mould cavities which when the first and second part moulds have mated together form a mould cavity capable of receiving said handle part and the immediately longitudinally adjacent part of the neck parts, and the apparatus incorporates one or more abutment surface positioned such that as the part of the skeleton and a part mould cavity relatively come together, one or more abutment surface abuts against at least one of the sections to urge the sections into the closer spaced together relationship.

3. An apparatus according to claim 2 wherein an abutment surface is provided by one or more of the part mould cavities having a ramp profiled abutment surface so that as a section is received by the part mould cavity, the ramp profiled surface abuts against the section to urge the section toward the closer spaced together relationship.

4. An apparatus according to claim 2 wherein an abutment surface is provided by a mould cavity capable of receiving the grip handle part and the neck part of the sections immediately adjacent to the grip handle part, but such that the head part of the section and the neck part of the section adjacent the head part extend outside of the part mould cavity, and an abutment surface is outside of a part mould cavity and positioned so that a section and the abutment surface may be brought into contact before the part moulds mate so that the abutment surface abuts against the section to urge the section toward the closer spaced together relationship.

\* \* \* \* \*